S. G. DARE.
TIRE DEFLATING INDICATOR.
APPLICATION FILED DEC. 2, 1915.
1,208,508.
Patented Dec. 12, 1916.
2 SHEETS—SHEET 2.
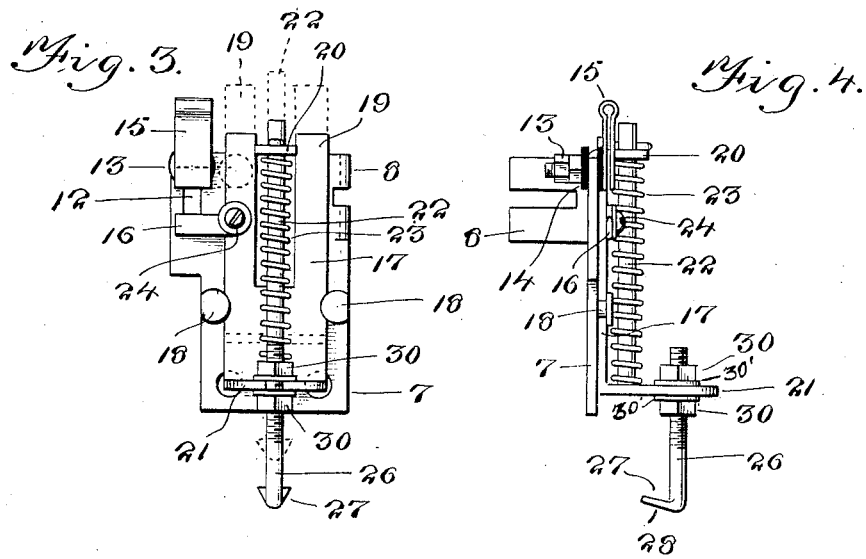
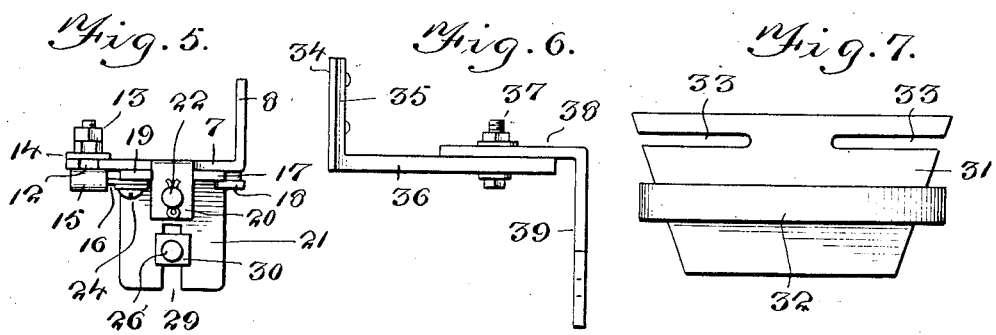
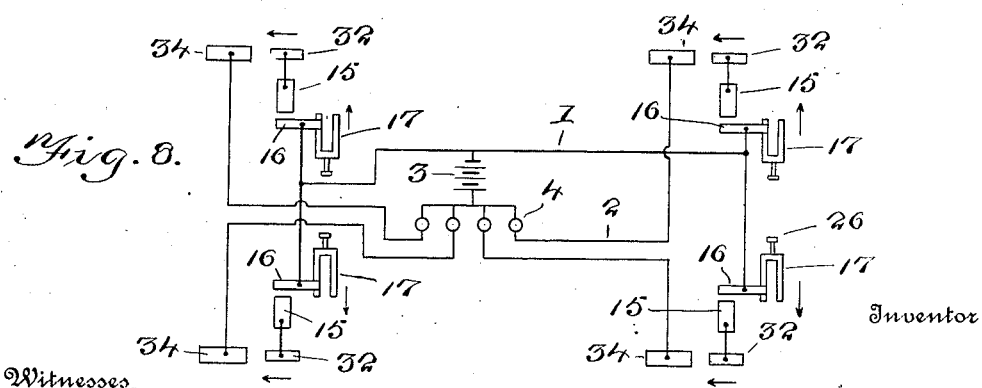
Witnesses
Inventor
Stockwell G. Dare
Attorney

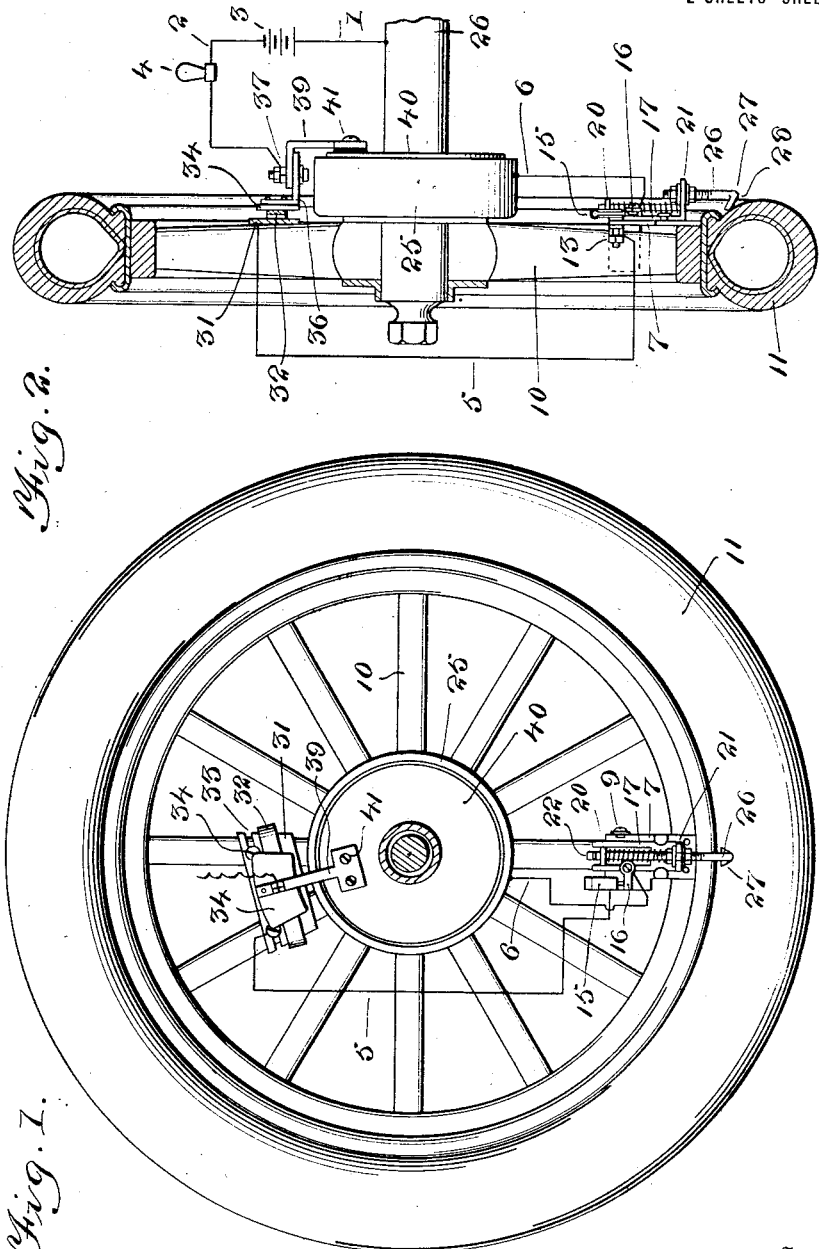

UNITED STATES PATENT OFFICE.

STOCKWELL G. DARE, OF WHITESTONE, NEW YORK.

TIRE-DEFLATING INDICATOR.

1,208,508.  Specification of Letters Patent.  Patented Dec. 12, 1916.

Application filed December 2, 1915. Serial No. 64,608.

*To all whom it may concern:*

Be it known that I, STOCKWELL G. DARE, a citizen of the United States of America, residing at Whitestone, in the county of Queens and State of New York, have invented certain new and useful Improvements in Tire-Deflating Indicators, of which the following is a specification.

This invention relates to improvements in tire deflation indicators of that character adapted for actuating a signal to indicate to the driver of an automobile when a tire becomes deflated or the pressure therein falls below a predetermined degree.

The primary object of the invention is to provide an electrically operated indicator including a circuit open at two points and having a switch governed by the pressure of the tire for closing it at one point and a make-and-break device for periodically closing it at the other point, whereby simplicity of construction, reduction in wear and tear upon the working parts and economy in the use of electric current will be secured.

A further object of the invention is to provide an indicator of the described character which may be employed upon any ordinary vehicle and vehicle wheel without the necessity of modifying the construction of the wheel or tire or the fitting of any portion of the device within the tire.

A still further object of the invention is to provide an indicator having a circuit closing member which is arranged adjacent to one side of the tire and is moved radially of the wheel for circuit closing action through the lateral thrust pressure of the laterally spread tire when the tire becomes deflated, and which is adjustable for a circuit closing action under any predetermined reduction of pressure in the tire and is positively locked when actuated in circuit closing position.

A still further object of the invention is to provide adjustable parts rendering the device applicable to different sizes of wheels and for coöperation with different sizes of tires and to also secure maximum sensitiveness of action.

A still further object of the invention is to provide an indicator wherein a series of signals and controlling devices may be employed in a circuit having a single source of energy for independently indicating deflating conditions with respect to the tires of the various wheels of the vehicle.

With these and other objects in view, the invention consists of the features of construction, combination and arrangement of parts herein fully described and claimed, reference being had to the accompanying drawings in which:—

Figure 1 is a side elevation of a wheel showing the parts of the indicator applied thereto. Fig. 2 is a vertical transverse section through the wheel. Fig. 3 is a side elevation of the circuit closing device. Fig. 4 is an edge view of the same. Fig. 5 is an end view of the circuit closing device. Fig. 6 is an edge view of one of the members of the make-and-break device. Fig. 7 is a side or face view of the other member of the make-and-break device. Fig. 8 is a diagrammatic view of a circuit including a plurality of signals or indicators.

In the illustrated embodiment of my invention I provide an open indicator or signal circuit, including a source of energy and one or more signals and having open terminals, and a bridging circuit, itself normally open and adapted to be closed by a switch device under a predetermined deflation of the tire, the terminals of the bridging circuit periodically engaging and completing the signal circuit through a make-and-break connection when the tire becomes deflated.

In carrying out the invention I provide a signal or indicating circuit including conductors 1 and 2, in which circuit there are arranged a source of energy 3 and one or more signals 4. The source of energy may be a storage or dry battery or may be a magneto operated by the engine, while the signal may be a lamp, as shown, a bell, or any suitable indicator. The terminals of the conductors 1 and 2 are connected with the elements of the circuit closing and make-and-break devices, as hereinafter fully described.

A bridging circuit including conductors 5 and 6 is mounted for rotation with the wheel and forms with the signal circuit a general indicating circuit which is open at two points, one of which points is controlled by a circuit closing device governed directly by the tire pressure, and the other of which points is controlled by a make-and-break device which periodically closes and energizes the signal circuit when the bridging circuit is closed and energized, or rather placed in condition for energization, by said circuit closing device.

The circuit closing device or switch comprises a bracket plate 7 which is provided with a slotted arm 8 for the passage of a bolt, screw or other suitable fastening device 9 to secure it to a spoke of the wheel 10 provided with the pneumatic tire 11, said bolt or screw being adjustable in the slot of the arm to fasten the bracket upon one side of the wheel at a greater or less distance from the spoke to which it is attached. The body of this plate is formed with a vertical slot 12 to receive a binding post 13 to which the conductor 5 is attached, which post is suitably insulated from the bracket plate, as illustrated at 14, and carries a combined terminal or contact piece and keeper 15, formed by a substantially U-shaped piece of spring conducting metal.

The contact piece and keeper 15 form a relatively fixed contact which is adjustable with relation to a relatively movable contact 16, so that the range of travel of the latter may be varied for a switch closing action according to conditions. The contact 16 is carried by a vertically movable head or plate 17 which is movable at its lower portion between headed guide studs 18 on the plate 7 and is formed at its upper portion with guide arms 19 movable on opposite sides of a forwardly projecting guide lug 20 on the plate 7, by which movement of the head 17 in a straight path is insured.

As previously stated, the contact and keeper 15 is composed of resilient or springy material and owing to the substantial U-shape of such contact and keeper the parallel legs of the same will frictionally engage the contact 16 when the latter is moved into the member 15 thereby holding the contact 16 in engagement with the contact 15 so that the controlled circuit will remain closed at this point.

The head 17 is provided at its lower end with an outwardly bent or right angular arm 21 from which rises a post or stem 22 which is movable through the opening in the lug 20 and about which is placed a coiled spring 23, disposed between the lug 20 and arm 21, and which operates to normally hold the head 17 retracted or depressed, and thereby maintain the switch contacts normally spaced apart or in open condition. The contact 16 is connected with a binding screw 24 to which is connected the conductor 6 which may be normally connected in circuit with the conductor 1 through the outer rotary drum 25 of the brake-band casing 25 and the axle 26 of the vehicle wheel, as clearly shown in Fig. 2.

Carried by the head 17 is a shoe or tire contact member comprising a rod or stem 26 carrying a laterally projecting contact 27 having an inclined or cam surface 28, which may be arranged at an oblique angle thereto. The stem 26 projects upwardly through a slot 29 in the arm 21 and is threaded to receive upper and lower sets of locking nuts 30 and washers 30' whereby it is adjustably secured in position. This shoe is supported by the arm 21 at a point adjacent to one of the sides of the tire 11 so as to overhang the tire between the rim portion and tread with its inclined or cam surface 28 lying lightly in contact with the surface of the tire, the shoe being through its described connection with the bracket arm adjustable both radially and laterally of the wheel so that provision may be made to secure a desired sensitiveness of action in the application of the invention to wheels and tires of different sizes. Furthermore, such adjustment adapts the shoe to be arranged so as to secure a switch closing movement at any point or degree in the deflation of the tire between minimum and maximum; or, in other words, to provide for giving a signal when a certain loss of pressure occurs or when the tire is fully deflated, as desired.

It will be observed that the shoe is arranged wholly upon the exterior of the tire and is adapted to receive motion directly from the tire upon the depression and lateral spreading of the tire due to deflation, the lateral motion of the tire due to its transverse increase in area being transmitted through the inclined or cam surface 28 of the shoe to convert such motion of the tire into an inward radial movement of the shoe against the resistance of the projecting spring 23 for a circuit closing action. Through the adjustability of the shoe and contact 15 it will be evident that the contacts 15 and 16 may be brought into engagement to close the circuit at any point in the range of movement of the shoe, thus enabling extreme sensitiveness of action to be secured, as well as providing for the closing of the circuit and giving of a signal when any predetermined degree of loss of pressure in the tire occurs.

The conductor 5 connects with one member of the circuit make-and-break device hereinbefore referred to, which member comprises a plate 31 carrying a bowed spring contact member or wiper 32, which may be adjustably mounted thereon, and which plate is formed with slots 33 for the passage of fastening screws 34 securing the same to adjacent spokes of the wheel, and with one of which screws the conductor 5 is connected. The spring wiper 32 is adapted at a certain point in the path of revolution of the wheel to engage the other member of the circuit make-and-break device, which member comprises a plate 34 carried by the right angular arm 35 of an L-shape bracket 36, the other arm or body portion of which is longitudinally slotted to receive a fastening bolt 37 which passes through one arm 38 of a fixed bracket member 39 which is secured to the fixed member 40 of the brake-band casing, as shown at 41. The screw 37 also serves as a binding screw to which the conductor 2 is attached, thus providing for the momentary and periodical connection of the signal and bridging circuits and closure of the signal circuit as a whole on each revolution of the wheel, when the circuit closing switch is closed as previously described, whereby the signal 4 will be energized to indicate a deflated condition of the tire. It will be evident that the bowed spring contact 32 is adapted to yield on engagement with the plate 34 and will operate in any position of the plate 34 relative thereto to make perfect contact with said plate and conform to all variations or inequalities of surface, so that a perfect electrical contact will be effected.

It will be understood from the foregoing description that in the use of the device, which is designed to be applied to any and all wheels, the driver will at once be notified of the condition of air pressure in a tire, whether the deflation is due to a leak or to the natural lessening of the air pressure under continued use, whereby proper correction may be made and rim cuts and similar injuries avoided. By the adjustability of the shoe and its supporting parts the device may also be made to operate under any variation of pressure in the tire so that, under all ordinary conditions, the driver may distinguish between deflations due to valve leakage or to actual punctures or other injuries to the tire proper, a source of great convenience in locating the cause of the trouble. In other words, the device will operate efficiently according to the action desired to indicate a slight leak or to indicate complete deflation only. As shown in Fig. 8 of the drawings a plurality of signals, circuit closers and circuit make-and-break devices may be employed in the circuit for use in conjunction with the different wheels of the vehicle, so that in case of deflation the particular tire giving trouble will at once be indicated. The object in employing a periodical make-and-break device between the circuit sections on the vehicle body and wheel, instead of employing a continuous connector, is to reduce expense from wear and tear while reducing liability of current leakage and at the same time effect a reduction in the amount of current consumed, which may be a matter of importance in the use of dry cells or a storage battery or an ignition circuit which is working defectively.

I claim:—

1. In a tire deflation indicator, a circuit closing device including a bracket plate carrying an adjustable stationary circuit closing member, said bracket plate having means for securing the same upon a wheel, a movable circuit closing member including a plate slidably connected with said bracket plate and mounted for movement radially of the wheel, a spring for normally holding said plate projected, and a shoe adjustably connected with said plate and having an inclined surface arranged adjacent to, externally of and at one side of the tire and adapted to be actuated to convert the lateral spread of the tire due to deflation into radial circuit closing motion to said movable circuit closing member.

2. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, and a contact carried by said head and adapted to engage said contact and keeper in the movement of said head along said bracket plate in the deflation of the tire.

3. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, and a contact carried by said head and adapted to engage said contact and keeper in the movement of said head along said bracket plate in the deflation of the tire, said contact and keeper being substantially U-shape and formed of springy material to frictionally engage said contact when engaged by the latter to hold the contact in engagement with the contact and keeper.

4. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, a contact carried by said head and adapted to engage said contact and keeper in the movement of said head along said bracket plate in the deflation of the tire, and a spring holding said head in normal position.

5. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, a contact carried by said head and adapted to engage said contact and keeper in the movement of said head along said bracket plate in the deflation of the tire, a lug integral with the inner end of said bracket plate and disposed at right angles thereto, a stem connected to said arm and slidably mounted in said lug, and a spring encircling said stem and acting upon said arm and lug to hold said head in normal position.

6. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, a contact carried by said head and adapted to engage said contact and keeper in the movement of said head along said bracket plate in the deflation of the tire, and means for guiding said head in its movement upon said bracket plate.

7. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, a contact carried by said head and adapted to engage said contact and keeper in the movement of said head along said bracket plate in the deflation of the tire, and studs carried by said bracket plate and engaging the respective side edges of said head to guide the latter in its movement.

8. A circuit closer of the class described comprising a bracket plate, a connection between said bracket plate and one spoke of the wheel, a contact and keeper adjustably connected to the inner end of said bracket plate, a head slidably mounted upon the outer surface of said bracket plate, an arm formed integral with the outer end of said head and disposed at right angles thereto, a tire contact member carried by said arm whereby said head may be moved along said bracket plate upon the deflation of the tire, and a contact carried by said head and adapted to engage said contact and keeper in the movement of said head along said bracket plate in the deflation of the tire, said tire contact member embodying an outwardly projecting rod formed with a laterally projecting contact having a cam surface designed to engage the tire.

9. A circuit closer of the class described comprising a bracket plate, a contact and keeper connected to the inner end of said bracket plate, a head slidably mounted upon said bracket plate, and a contact carried by said head and adapted to engage said contact and keeper in the movement of the head in one direction, said contact and keeper being formed in such manner as to frictionally engage the second-named contact to hold the latter in circuit closing position.

10. A circuit closer of the class described comprising a bracket plate, a contact and keeper connected to the inner end of said bracket plate, a head slidably mounted upon said bracket plate, and a contact carried by said head and adapted to engage said contact and keeper in the movement of the head in one direction, said contact and keeper being of substantially U-shape and formed of resilient material and adapted to frictionally engage said last contact to hold the latter in circuit closing position.

In testimony whereof I affix my signature in the presence of two witnesses.

STOCKWELL G. DARE.

Witnesses:
WILLIAM C. NICLOS,
MARTIN A. GLEASON.